United States Patent Office 3,000,947
Patented Sept. 19, 1961

---

3,000,947
OPTICAL RESOLUTION OF ALPHA-NAPHTHYLETHYLAMINES
Robert R. Bottoms, Crestwood, Ky., assignor to Chemetron Corporation, Chicago, Ill., a corporation of Delaware
No Drawing. Filed Sept. 23, 1957, Ser. No. 685,367
5 Claims. (Cl. 260—570.8)

This invention relates to the resolution of racemic alpha-naphthylethylamines (also known as 1-amino-1-naphthylethanes) into optically active forms. More particularly, it relates to a method of resolving the alpha-naphthylethylamines by use of D- or L-menthyl hydrogen phthalate.

The alpha-naphthylethylamines or 1-amino-1-naphthylethanes are a group of substances having the following general formula:

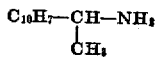

There are two position isomers wherein the chain is attached to the alpha- and beta-positions of the naphthalene nucleus. Each of the position isomers exists in a racemic form by virtue of the asymmetric carbon atom bearing the amino radical. Each racemate can exist in two optically active forms.

The optically active forms of the alpha-naphthylethylamines are useful as resolving agents for racemic acidic materials. However, they must be produced synthetically and, therefore, must be resolved prior to use as resolving agents.

The alpha-naphthylethylamines have been resolved by use of naturally occurring optically active acids such as D-camphoric acid and D-tartaric acid. Generally, naturally occurring optically active acids are not readily available and are expensive, so that there is need for a method of resolution of alpha-naphthylethylamines which does not require naturally occurring acids.

It is an object of this invention to provide a method of producing optically active alpha-naphthylethylamines. It is a further object of the invention to provide a method of producing such amines economically and efficiently from readily available starting materials. It is another object of this invention to provide a method for resolving such amines in benzene as the solvent. These and other objects of the invention are apparent from and are achieved in accordance with the following disclosure.

The present invention pertains to the use of an optically active menthyl hydrogen phthalate, which is readily available in the production of optically active menthol by resolution of DL-menthol, as the resolving agent for the alpha-naphthylethylamines. L-menthyl hydrogen phthalate is one of the optically active isomers which is separated in the resolution of DL-menthol. In ordinary practice, this acid ester is hydrolyzed with alkali to provide L-menthol, but in the present invention this material is used as a resolving agent prior to its saponification. In this way this valuable optically active material is utilized as a resolving agent while in the acid form and subsequently it can be converted into L-menthol.

Broadly, the present invention is based on the use of D- or L-menthyl hydrogen phthalate as the resolving agent for alpha-naphthylethylamines in benzene as the solvent. A solution of one of the racemic alpha-naphthylethylamines in benzenes is reacted with an equivalent amount of an optically active menthyl hydrogen phthalate and one of the optically active salts crystallizes out of the benzene solution. This salt may be further purified by crystallization from benzene and then treated with aqueous acid to separate the optically active amine from the D- or L-menthyl hydrogen phthalate. The optically active alpha-naphthylethylamine is then removed and purified by distillation or other suitable procedure. The optically active menthyl hydrogen phthalate which is recovered can then be saponified by aqueous alkali to provide optically active menthol for commercial use.

The invention can be applied to either position isomer, namely, DL-alpha-(alpha-naphthyl)ethylamine or DL-alpha - (beta - naphthyl)ethylamine. As the resolving agent, either L-menthyl hydrogen phthalate or D-menthyl hydrogen phthalate may be used in benzene solvents. By the use of either of these optically active acid esters, either of the racemic alpha-naphthylethylamines can be resolved into their optically active forms. In each resolution one of the optically active forms of the amine will form a less soluble salt with the optically active menthyl hydrogen phthalate. This salt is removed from the solution and further purified to constant optical rotation. There remains in the solution the more soluble salt which can be isolated by evaporation of the solvent and further crystallization from the appropriate solvent. Treatment of the salts with dilute mineral acid liberates the free amines. In this way, each of the four optically active forms of the alpha-naphthylethylamines can be obtained: L - alpha - (alpha-naphthyl)ethylamine, D-alpha - (alpha-naphthyl)ethylamine, L-alpha-(beta-naphthyl)ethylamine and D-alpha-(beta-naphthyl)ethylamine. Each of these amines is useful as a resolving agent for acidic racemic substances, such as acylated alpha-amino acids or racemic acid esters of DL-menthol with dibasic acids, such as DL-menthyl hydrogen succinate.

As noted above, the optically active alpha-naphthylethylamines are of value as resolving agents for racemic acidic substances. For example L-alpha-(beta-naphthyl)-ethylamine and L-alpha-(alpha-naphthyl)ethylamine are useful in the optical resolution of acylated alpha-amino acids in the production of synthetic amino acids identical to those found in nature. The corresponding D-amines are valuable in the resolution of DL-menthol in the production of L-menthol through acid esters of DL-menthol with dibasic acids such as succinic acid.

The invention is further disclosed by means of the following examples which are provided solely for illustration and which are not intended to limit the invention in scope. It will be apparent to those skilled in the art that numerous modifications in concentrations, temperatures, times and the like, may be made without departing from the invention.

Example 1

To 3000 grams of L-menthyl hydrogen phthalate dissolved in 5 liters of warm benzene are added 1700 grams of DL-alpha-(alpha-naphthyl)ethylamine (or DL-1-amino-1-(1-naphthyl)ethane). The mixture is allowed to set for 10 to 15 hours during which time the L-menthyl hydrogen phthalate salt of D-alpha-(alpha-naphthyl)-ethylamine will have crystallized out. The crystals are centrifuged off and then dissolved by heating and stirring in about an equal weight of benzene and the product again permitted to stand until crystallization is complete. The resulting crystals are separated and again recrystallized from benzene and the crystals again separated. The final crystals are then disolved in benzene and the resulting optically pure D-alpha-(alpha-naphthyl)ethylamine recovered by treating the benzene solution with a slight excess of aqueous hydrochloric acid to decompose the amine salt. The aqueous layer containing the hydrochloride of the amine is then separated and the amine set free by addition of caustic soda. The resulting optically pure dextro-rotary amine is then separated and purified by distillation. D-alpha-(alpha-naphthyl)ethylamine thus prepared has a specific rotation of +62° (c.=5% in methanol).

Example 2

To 3000 grams of L-menthyl hydrogen phthalate dissolved in 5 liters of warm benzene are added 1700 grams of DL-alpha-(alpha-naphthyl)ethylamine (or DL-1-amino-1-(1-naphthyl)ethane). The mixture is allowed to stand at room temperature overnight during which time D-alpha-(alpha-naphthyl)ethylamine L-menthyl hydrogen phthalate crystallizes out. The crystals are removed by centrifugation and the mother liquor is separated and evaporated under vacuum. When the mother liquor is concentrated to approximately half its original volume it is centrifuged to remove crystals of mixed salts which have formed. Then the evaporation of the mother liquor under vacuum is continued until substantially all of the solvent has been removed. The crystalline residue of L-alpha-(alpha-naphthyl)ethylamine L-menthyl hydrogen phthalate is recrystallized from commercial anhydrous methanol (98–99%) until constant optical rotation. The salt is then dissolved in benzene and treated with an excess of aqueous mineral acid to decompose the salt and liberate the amine. The aqueous phase is separated, neutralized with caustic soda solution, and the L-alpha-(alpha-naphthyl)ethylamine is separated, dried and distilled. This amine has a specific rotation of −62° (c.=5% in methanol).

Example 3

D-alpha-(beta-naphthyl)ethylamine (or D-1-amino-1-(2-naphthyl)ethane) and L-alpha-(beta-naphthyl)ethylamine (or L-1-amino-1-(2-naphthyl)ethane) are prepared according to the procedure of Examples 1 and 2, respectively.

The precipitate of D-alpha-(beta-naphthyl)ethylamine is removed from the mother liquor and recrystallized from 90% aqueous methanol to constant rotation (+57°, c.=5% in methanol). Then the D-alpha-(beta naphthyl)ethylamine is freed from the salt by treatment with alkali as in Example 1, separated and distilled under reduced pressure. It has a specific rotation of +22° (c.=5% in methanol).

The more soluble salt of L-alpha-(beta-naphthyl)ethylamine is isolated by evaporation of the mother liquor and crystallization of the residue from methanol. The L-alpha-(beta-naphthyl)ethylamine is liberated from the salt by reaction with dilute mineral acid, neutralization of the acid solution, extraction and distillation under reduced pressure. It has a specific rotation of −22° (c.=5% in methanol).

What is claimed as new and is desired to be obtained by Letters Patent of the United States is:

1. A method of resolving 1-amino-1-naphthylethane into optically active forms which comprises forming a salt of 1-amino-1-naphthylethane with an optically active menthyl hydrogen phthalate in benzene, crystallizing the less soluble salt of an optically active 1-amino-1-naphthylethane with said optically active menthyl hydrogen phthalate from the benzene solution, separating said salt from said solution and liberating the optically active 1-amino-1-naphthylethane from said salt by treatment with acid.

2. A method of preparing D-1-amino-1-(1-naphthyl)ethane from DL-alpha-(alpha-naphthyl)ethylamine which comprises forming a salt of DL-1-amino-1-(1-naphthyl)ethane with L-menthyl hydrogen phthalate in benzene, crystallizing the D-1-amino-1-(1-naphthyl)ethane L-menthyl hydrogen phthalate from the benzene solution, separating said D-1-amino-1-(1-naphthyl)ethane L-menthyl hydrogen phthalate from said solution and liberating the D-1-amino-1-(1-naphthyl)ethane from said salt by treatment with acid.

3. A method of producing L-1-amino-1-(1-naphthyl)-ethane which comprises forming a salt of DL-1-amino-1-(1-naphthyl)ethane with L-menthyl hydrogen phthalate in benzene, crystallizing the D-1-amino-1-(1-naphthyl)ethane L-menthyl hydrogen phthalate from the benzene solution, separating said D-1-amino-1-(1-naphthyl)ethane L-menthyl hydrogen phthalate from said benzene solution, evaporating said benzene solution to cause separation of L-1-amino-1-(1-naphthyl)ethane L-menthyl hydrogen phthalate, removing said L-1-amino-1-(1-naphthyl)ethane L-menthyl hydrogen phthalate and purifying said salt and separating the L-1-amino-1-(1-naphthyl)ethane from said salt by treatment with aqueous alkali.

4. A method preparing D-1-amino-1-(2-naphthyl)ethane from DL-1-amino-1-(2-naphthyl)ethane which comprises forming a salt of DL-1-amino-1-(2-naphthyl)ethane with L-menthyl hydrogen phthalate in benzene, crystallizing the D-1-amino-1-(2-naphthyl)ethane L-menthyl hydrogen phthalate from the benzene solution, separating said D-1-amino-1-(2-naphthyl)ethane L-menthyl hydrogen phthalate from said solution and liberating the D-1-amino-1-(2-naphthyl)ethane from said salt by treatment with acid.

5. A method of producing L-1-amino-1-(2-naphthyl)-ethane which comprises forming a salt of DL-1-amino-1-(2-naphthyl)ethane with L-menthyl hydrogen phthalate in benzene, crystallizing the D-1-amino-1-(2-naphthyl)ethane L-menthyl hydrogen phthalate from the benzene solution, separating said D-1-amino-1-(2-naphthyl)ethane L-menthyl hydrogen phthalate from said benzene solution, evaporating said benzene solution to cause separation of L-1-amino-1-(2-naphthyl)ethane L-menthyl hydrogen phthalate, removing said L-1-amino-1-(2-naphthyl)ethane L-menthyl hydrogen phthalate and purifying said salt and separating the L-1-amino-1-(2-naphthyl)ethane from said salt by treatment with aqueous alkali.

References Cited in the file of this patent

UNITED STATES PATENTS

| | | |
|---|---|---|
| 2,240,318 | Tabern | Apr. 29, 1941 |

FOREIGN PATENTS

| | | |
|---|---|---|
| 148,444 | Australia | July 14, 1949 |

OTHER REFERENCES

Pickard: Journal of the Chemical Society, vol. 101 (1912), pages 109–127 (pgs. 119–121 relied on).

Paolini: Chemical Abstracts, vol. 14, page 2173 (1920).

Samuelsson: Chemical Abstracts, vol. 16, pages 2140–1 (1922), as abstracted from Svensk Kemisk Tielskrift, vol. 34, pages 7–9 (1922).

Samuelsson: Chem. Abstracts, vol. 18, pages 1833–1834 (1924).

Elsevier's Encyclopedia of Organic Chemistry, vol. 12B, pages 424–425, 3rd. Series (1949), Elsevier Publishing Co., New York.

Karrer: Organic Chemistry, pages 103–104 (1950), 4th ed., Elsevier Publishing Co., New York.

Gilman: Organic Chemistry, vol. 1, page 259, 2nd edition (1953), John Wiley & Sons, Inc., New York.